Aug. 21, 1923.
C. F. SCHMELZ
1,465,488
PIPE THREADING MACHINE
Filed Dec. 15, 1919
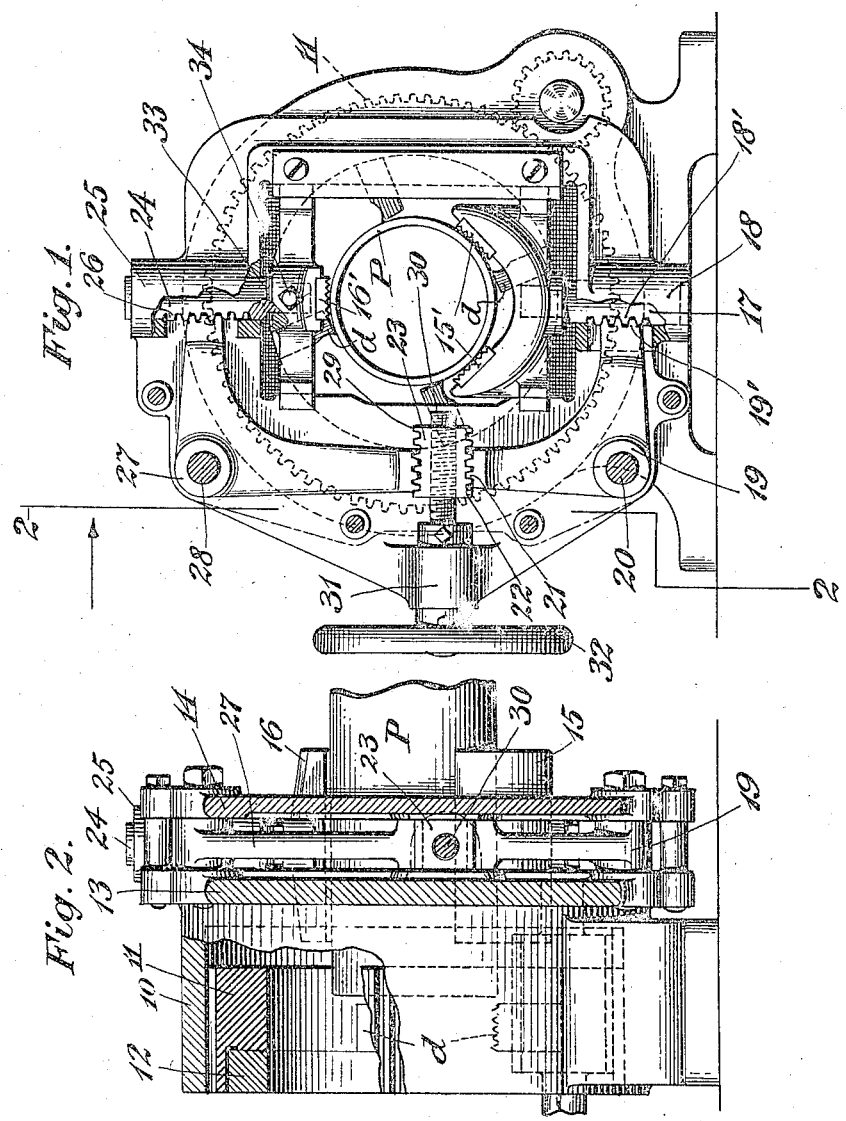
INVENTOR
Chas. F. Schmelz Patented Aug. 21, 1923.

1,465,488

UNITED STATES PATENT OFFICE.

CHARLES F. SCHMELZ, OF BRIDGEPORT, CONNECTICUT.

PIPE-THREADING MACHINE.

Application filed December 15, 1919. Serial No. 344,971.

*To all whom it may concern:*

Be it known that I, CHARLES F. SCHMELZ, a citizen of the United States, residing at Bridgeport, in the county of Fairfield and State of Connecticut, have invented new and useful Improvements in Pipe-Threading Machines, of which the following is a specification.

This invention relates to pipe-threading machines, and more especially to that class thereof, in which the pipe to be threaded is rigidly supported and held against rotation, and it has for one of its objects the provision of an improved clamping device and its operating mechanism whereby the same is rendered self-centering relatively to a fixed axis around which the threading-dies or chasers are revolved during the threading operation.

My invention has, furthermore, for its object the provision of improved means for adjusting the zone of travel of one of the jaws of the clamping device, relatively to the other jaw thereof, but without in any way changing the linear travel of such jaw.

Other objects of the invention will hereinafter appear and be particularly pointed out in the claims.

The invention has been clearly illustrated in the accompanying drawings, in which similar characters denote similar parts, and in which—

Figure 1 represents a rear view of a pipe threading machine, and more especially the vise-portion thereof. Fig. 2 is a section on line 2—2 of Fig. 1.

Referring to the drawings, 10 denotes a cylindrical shell the interior of which is adapted to support rotatively a gear or die-carrier 11 in which the threading dies *d* are supported and held by a face plate 12. Formed on the rear portion of the shell, is a housing plate 13 having a cover 14, the space between these two elements being adapted to hold the jaws in slidable condition relatively to each other. In the present instance I have illustrated a pair of jaws 15, 16, the lower jaw 15 being comparatively deep to serve as a trough into which the pipe P is laid, as shown, to be engaged by jaw-steels 15' the inclination of which are such as to form an angle of substantially ninety degrees. The upper jaw 16 has a jaw-steel 16' adapted to engage the central upper portion of the periphery of the pipe.

From the construction shown, it is evident that, in order to maintain the central relationship of different-size pipes relatively to the axis of the shell and die-carrying gear, the movement of the lower jaw is more than the travel of the upper jaw, the ratio of such movement depending upon the angle enclosed by the jaw steels 15' above mentioned.

In practice it was determined that this ratio for a ninety-degree enclosed angle is substantially seven units for the lower jaw, as against five units for the upper jaw.

The lower jaw 15 has a stem 17 mounted for vertical sliding movement in a hub 18 which forms a part of the rear housing above referred to, and the stem has a number of rack teeth 18' which are in engagement with similar teeth 19' formed on one branch of an angle lever 19 which is pivoted at 20, and the vertical branch of which has segmental teeth 21 in engagement with rack-teeth 22 formed on a nut 23. In a similar manner, the upper jaw 16 has a stem 24 movable in a hub or boss 25 of the housing and provided with teeth 26 in engagement with similar teeth formed on the horizontal branch of an angle lever 27, which latter is pivoted at 28 and has a vertically downward extension or branch engaging rack teeth 29 formed in the upper face of the nut 23 above referred to.

It follows, therefore, that, when the nut is moved toward the left (see Fig. 1), both jaws will be moved toward the axial center line of the housing, and inasmuch as the horizontal branches of the levers (from the pivot-center to the pitch line of the teeth) are preferably of the same identical length, the dimensions of the vertical branches are proportioned in the ratio of seven to five, thus bringing the center line of the nut 23 to a position below the axis of the pipe.

A screw 30 for operating the nut is journaled in a hub 31 of the housing plate 13, a collar serving to keep said screw against outward longitudinal movement in the hub, while a hand wheel 32 performs the same function in the other direction.

Means are provided for exactly centralizing the jaws when assembling the parts so as to compensate for inaccuracies which are generally in evidence and adherent to the practical work of building the machine, and in the present instance I prefer to adjust the upper jaw to bring it into contact with a true cylindrical standard piece supported in the trough of the lower jaw in exact axial coincidence with the axis of the die-carrier. The desired result is here accomplished by the use of shims 33 interposed between the shoulder of the upper jaw stem 24 and the upper face of the jaw-hub, a set screw 34 serving to retain the jaw 16 on the stem, as will be readily understood.

Both jaws may be provided with side-wings, as shown, to retain the gripping faces in proper parallelism with the axis of the machine.

Changes may be made in the general organization, as well as in the particular construction of some of the component elements of my improved device, without departing from the spirit of the invention as defined by the claims.

I claim:—

1. A clamping mechanism comprising a pair of jaws, each having a stem, a pair of angle-levers each having one arm in engagement with one of said stems respectively, a slidable nut engaging the other arms of said levers respectively, and a rotatable non-slidable screw for operating said slidable nut.

2. The combination, with a pair of oppositely-movable jaws, each having a stem provided with rack-teeth, of a pair of angle levers, each having one arm in engagement with said rack-teeth respectively, and each having its other arm provided with segmental teeth, a slide block having rack teeth in engagement with said segmental teeth, and means for positively moving said block in either direction.

3. The combination, with a pair of differentially movable jaws, of a pair of angle levers, one arm of one lever facing one arm of the other lever, the other arms of said levers engaging said jaws respectively, and means for moving said facing arms of said levers simultaneously, the movements of the other arms of said levers being proportionate to the differential travel of said jaws.

CHARLES F. SCHMELZ.

Witnesses:
A. E. SCHMELZ,
V. W. NICHOLSON.